United States Patent [19]
Takahashi et al.

[11] Patent Number: 5,909,903
[45] Date of Patent: Jun. 8, 1999

[54] COUPLING STRUCTURE FOR COUPLING TWO PIPES

[75] Inventors: Yoichi Takahashi, Kanagawa; Eizo Suyama, Tokyo, both of Japan

[73] Assignee: Calsonic Corporation, Tokyo, Japan

[21] Appl. No.: 08/821,776

[22] Filed: Mar. 20, 1997

[30] Foreign Application Priority Data

Mar. 21, 1996 [JP] Japan ................................ 8-064527

[51] Int. Cl.⁶ ................................................ F16L 21/00
[52] U.S. Cl. ........................ 285/330; 285/371; 285/398
[58] Field of Search .................................... 285/371, 398, 285/330, 365, 366, 367

[56] References Cited

U.S. PATENT DOCUMENTS

| | | | |
|---|---|---|---|
| 381,869 | 4/1888 | Williams | 285/371 |
| 956,294 | 4/1910 | Corcoran | 285/371 |
| 1,005,466 | 10/1911 | Priest | 285/371 |
| 1,197,858 | 9/1916 | Redmon | 285/398 |
| 1,329,121 | 1/1920 | Hachman | 285/371 |
| 2,065,480 | 12/1936 | Soper et al. | . |
| 2,112,266 | 3/1938 | Brand | 285/398 |
| 2,769,648 | 11/1956 | Herman | 285/366 |
| 3,087,747 | 4/1963 | Novotny | 285/398 |
| 3,503,632 | 3/1970 | Braun | . |
| 3,907,341 | 9/1975 | Schoepe | 285/371 |
| 4,053,247 | 10/1977 | Marsh, Jr. | 403/279 |
| 4,693,502 | 9/1987 | Oetiker | 285/334 |
| 4,695,080 | 9/1987 | Oetiker | 285/365 |
| 5,201,550 | 4/1993 | Burkit | 285/371 |

FOREIGN PATENT DOCUMENTS

| | | | |
|---|---|---|---|
| 47-13810 | 4/1972 | Japan | 285/398 |
| 5-64595 | 8/1993 | Japan | . |
| 629397 | 9/1978 | U.S.S.R. | 285/398 |

*Primary Examiner*—Eric K. Nicholson
*Attorney, Agent, or Firm*—Foley & Lardner

[57] ABSTRACT

For coupling first and second metal pipes, a coupling structure is provided which comprises a first diametrically angled end portion of the first metal pipe and a second diametrically enlarged end portion of the second metal pipe. The second enlarged end portion is mated with the first enlarged end portion so that the first and second metal pipes are aligned. A collar member of metal is concentrically disposed within the mated first and second enlarged end portions. The collar member is formed, around an axially middle portion thereof, with an annular ridge which entirely and intimately contacts with inner surfaces of the mated first and second enlarged end portions. A fastening ring of metal is concentrically disposed about the mated first and second enlarged end portions. The fastening ring is so shaped as to have a concave inner surface which intimately and entirely contacts with rounded outer surfaces of the mated first and second enlarged end portions.

6 Claims, 2 Drawing Sheets

COUPLING STRUCTURE FOR COUPLING TWO PIPES

BACKGROUND OF THE INVENTION

1. Field of the Invention

The present invention relates in general to a coupling structure for coupling metal pipes, and more particularly to a coupling structure for coupling two metal pipes without using welding.

2. Description of the Prior Art

In the field of motor vehicles, various attempts have been made for reducing the weight and cost of the engine system and thus those of the vehicle. One of them is to reduce the thickness of metal pipes which constitute an exhaust passage incorporated in the exhaust system of the engine. Hitherto, in assembling the exhaust system, arc welding has been widely employed for coupling the pipes. However, as is known, with reduction in thickness of the pipes, such arc welding becomes very difficult because it tends to produce welding defects, such as openings formed in the welded portion. Thus, recently, other coupling techniques without depending on the welding have been eagerly desired for the pipe coupling in the exhaust system. One of them is disclosed in Japanese Laid-open Utility Model Application 5-64595, in which a collar unit, a fastening band unit and fastening bolts and nuts are used.

For clarifying the invention, the coupling technique of the publication will be briefly described with reference to FIGS. 3 and 4 of the accompanying drawings. FIG. 3 is a partially sectional side view of a coupling structure through which two metal pipes are coupled, and FIG. 4 is a section view taken along the line IV—IV of FIG. 3.

In FIGS. 3 and 4, denoted by numerals 11 and 13, are first and second metal pipes which are to be connected in tandem. For the coupling, the pipes 11 and 13 have diametrically enlarged end portions 11a and 13a which are mated at their leading ends.

Within the mated end portions 11a and 13a of the pipes 11 and 13, there is concentrically disposed a collar unit 15. The collar unit 15 comprises an inner collar member 15a and an outer collar member 15b which are welded to each other at their axial end portions. At an axially middle portion of the outer collar member 15b is formed therearound an annular ridge 15b' which is in intimate contact with inner surfaces of the enlarged end portions 11a and 13a of the pipes 11 and 13, as shown.

Around the enlarge end portions 11a and 13a of the pipes 11 and 13, there is intimately disposed a fastening band unit 17 which, as is seen from FIG. 4, comprises upper and lower semicircular bands 17a and 17b which are fastened to each other through two pairs of bolts 19 and nuts 21. Each band 17a or 17b has a concave inner surface intimately contacting an outer surface of the enlarged end portion 11a or 13a of the pipe 11 or 13.

For holding the bolts 19 and nuts 21, each band 17a or 17b is formed at diametrically opposed ends with flanges (no numerals). As is understood from FIG. 3, when the bolts 19 are turned in a tightening direction, the two semicircular bands 17a and 17b are gradually pressed against the enlarged end portions 11a and 13a of the pipes 11 and 12. During this pressing, the enlarged end portions 11a and 13a are gradually pressed against the outer collar member 15b of the collar unit 15. Thus, finally, the two metal pipes 11 and 13 are tightly coupled having the enlarged end portions 11a and 13a thereof firmly sandwiched between the collar unit 15 and the fastening band unit 17. With this tight coupling, hermetic sealing is achieved between the two pipes 11 and 13.

However, due to inherent construction, the above-mentioned conventional coupling structure has the following drawbacks.

First, the coupling structure needs numerous parts for the assemblage, which brings about complicated construction, troublesome and time consuming assembling work and thus increased cost.

Second, as is shown in FIG. 4, even in the tightly coupling condition, the coupling structure has inevitably certain clearances W1 and W2 between the mutually facing flanges of the semicircular bands 17a and 17b. As is known, such clearances W1 and W2 produce areas near the flanges where only insufficient fastening force is produced by the fastening band unit 17. In this case, undesired gas leakage through such areas tends to occur.

SUMMARY OF THE INVENTION

It is therefore an object of the present invention to provide a coupling structure for coupling metal pipes, which is free of the above-mentioned drawbacks.

According to the present invention, there is provided a coupling structure for coupling metal pipes, which exhibits excellent sealing between the pipes irrespective of its simple construction.

According to a first aspect of the present invention, there is provided a combination which comprises first and second pipes each having a diametrically enlarged end portion, the first and second pipes being aligned having the respective enlarged end portions mated; a metal collar member concentrically disposed within the mated enlarged end portions of the pipes, the collar member being formed, around an axially middle portion thereof, with an annular ridge which entirely and intimately contacts inner surfaces of the enlarged end portions; and a metal fastening ring concentrically and intimately disposed about the mated enlarged end portions of the pipes, the fastening ring being shaped to have a concave inner surface which intimately and entirely contacts rounded outer surfaces of the enlarged end portions of the pipes.

According to a second aspect of the present invention, there is provided a coupling structure for coupling first and second metal pipes, which comprises a first diametrically enlarged end portion of the first metal pipe; a second diametrically enlarged end portion of the second metal pipe, the second enlarged end portion being mated with the first enlarged end portion so that the first and second metal pipes are aligned; a collar member of metal concentrically disposed within the mated first and second enlarged end portions of the first and second metal pipes, the collar member being formed, around an axially middle portion thereof, with an annular ridge which entirely and intimately contact sinner surfaces of the mated first and second enlarged end portions; and a fastening ring of metal concentrically disposed about the mated first and second enlarged end portions, the fastening ring being so shaped as to have a concave inner surface which intimately and entirely contacts rounded outer surfaces of the mated first and second enlarged end portions.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
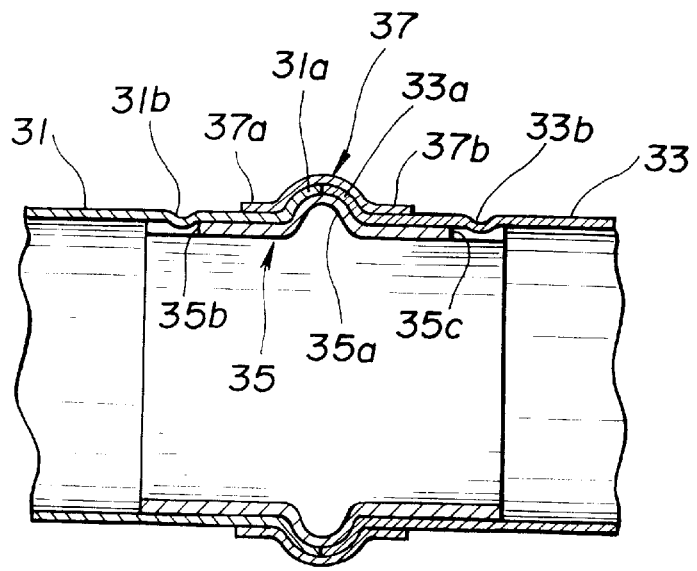
FIG. 1 is a sectional view of a coupling structure according to the preset invention, through which two metal pipes are connected in tandem.
Figure 2:
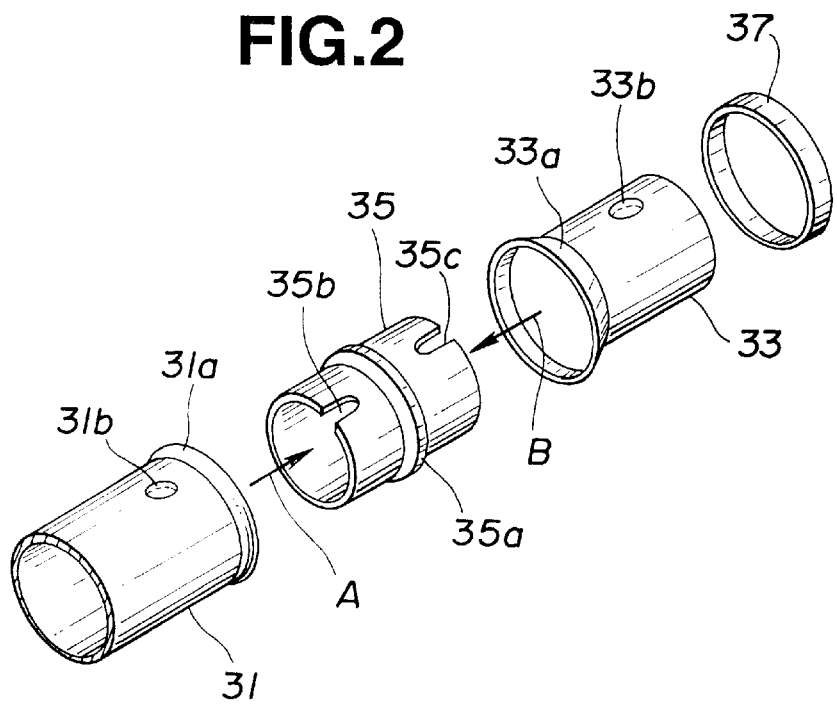
FIG. 2 is an exploded perspective view of the coupling structure of the present invention.

Referring to FIGS. 1 and 2, there is shown a coupling structure of the present invention.

In the drawings, denoted by numerals 31 and 33 are first and second metal pipes which are to be connected in tandem by the coupling structure of the invention. The pipes 31 and 33 may be constructed of stainless steal of 0.8 mm in thickness when used for production of an exhaust pipe of an internal combustion engine. For the coupling, the pipes 31 and 33 have diametrically enlarged end portions 31a and 33a which are mated at their loading ends. For the purpose which will be described hereinafter, each pipe 31 or 33 is formed near the leading end thereof with an inwardly projected boss 31b or 33b.

Within the mated end portions 31a and 33a of the pipes 31 and 33, there is concentrically disposed a single collar member 35 of stainless teal having a thickness of about 0.8 mm. If desired, the thickness of the collar member 35 is greater than 0.8 mm, for example, 0.10 mm. As is seen from FIG. 2, the collar member 35 is formed at axially opposed ends thereof with respective notches 35b and 35c which, upon coupling of the pipes 31 and 33, accommodate therein the bosses 31b and 33b of the pipes 31 and 33. Thus, upon assembly, rotation of the collar member 35 about its axis and axial movement of the same are assuredly suppressed.

An axially middle portion of the collar member 35 is formed therearound with an annular ridge 35a which entirely and intimately contacts with inner surfaces of the enlarged end portions 31a and 33a of the pipes 31 and 33. The annular ridge 35a has a generally semicircular cross section and is produced by using a known beading process. As is seen from FIG. 1, non-projected remaining portions of the collar member 35 also entirely and intimately contact with inner surfaces of non-enlarged remaining end portions of the pipes 31 and 33.

Around the enlarged end portions 31a and 33a of the pipes 31 and 33, there is intimately disposed a fastening ring 37 of stainless steel which has a thickness of about 0.3 mm. As shown in FIG. 1, when subjected to an after-mentioned pressing or rolling process, the fastening ring 37 is shaped to have a concave inner surface intimately and entirely contacting with rounded outer surfaces of the enlarged end portions 31a and 33a of the pipes 31 and 33. The shaped fastening ring 37 has flange portion 37a and 37b at axial ends, which intimately and entirely contact with the outer surfaces of non-enlarged remaining end portions of the pipes 31 and 33.

In the following, steps for coupling the metal pipes 31 and 33 will be described with reference to FIG. 2.

First, a blank (see FIG. 2) for the fastening ring 37 is brought onto either one of the first and second pipes 31 and 33. Under this condition, the fastening ring 37 has a simple shape, as shown in FIG. 2. Then, as indicated by arrows "A" and "B", the two metal pipes 31 and 33 are pressed onto opposed end portions of the collar member 35, registering the inwardly projected bosses 31b and 33b with the notches 35b and 35c of the collar member 35 respectively. Then, the two pipes 31 and 33 are pressed toward each other, assuring that the enlarged end portions 31a and 33a thereof are properly placed on the annular ridge 35a of the collar member 35 and the bosses 31b and 33b are properly received in the notches 35b and 35c of the collar member 35. Under this condition, the enlarged end portions 31a and 33a of the pipes 31 and 33 are mated at their leading ends, as will be understood from FIG. 1. Then, the fastening ring 37 is slid onto the mated enlarged end portions 31a and 33a. Then, the fastening ring 37 on the mated portions 31a and 33a is subjected to a pressing or rolling process to be shaped or pressed, so that the ring 37 has the concave inner surface which intimately and entirely contacts with the enlarged end portions 31a and 33a of the pipes 31 and 33. Thus, upon assembly, the two metal pipes 31 and 33 are tightly connected in tandem having the enlarged end portions 31a and 33a thereof firmly sandwiched between the collar member 35 and the shaped fastening ring 37. With this tight coupling, hermetic sealing is achieved between the two pipes 31 and 33.

In the following, disadvantages of the present invention will be described.

First, as will be understood from the above, the coupling structure of the present invention uses only a few parts for the assemblage, which allows simple construction, simple assembling work and thus lower cost.

Figure 3:
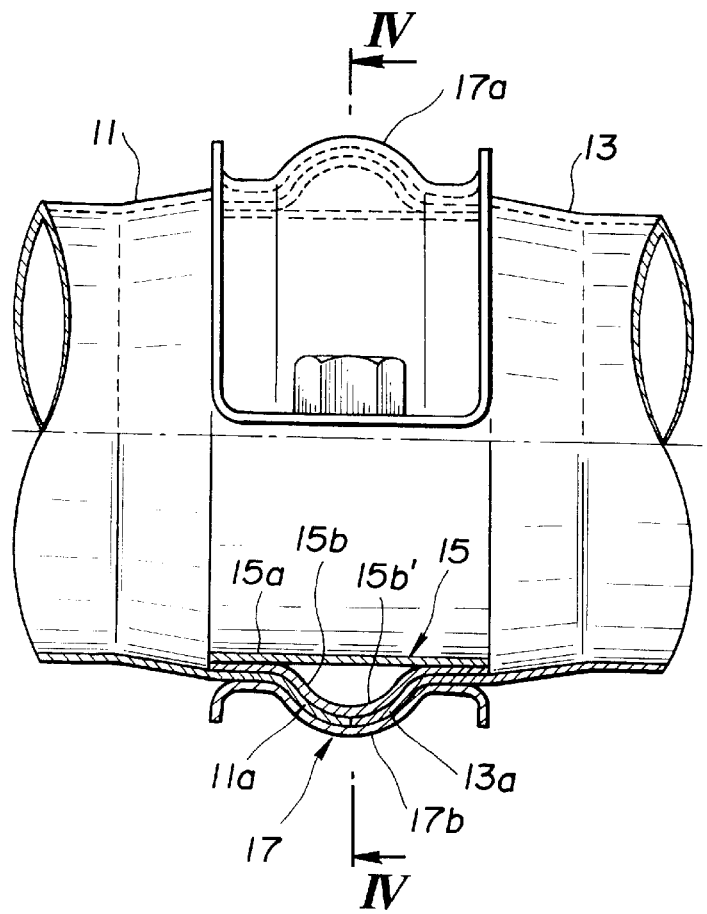
FIG. 3 is a partially sectional view of a conventional coupling structure.
Figure 4:
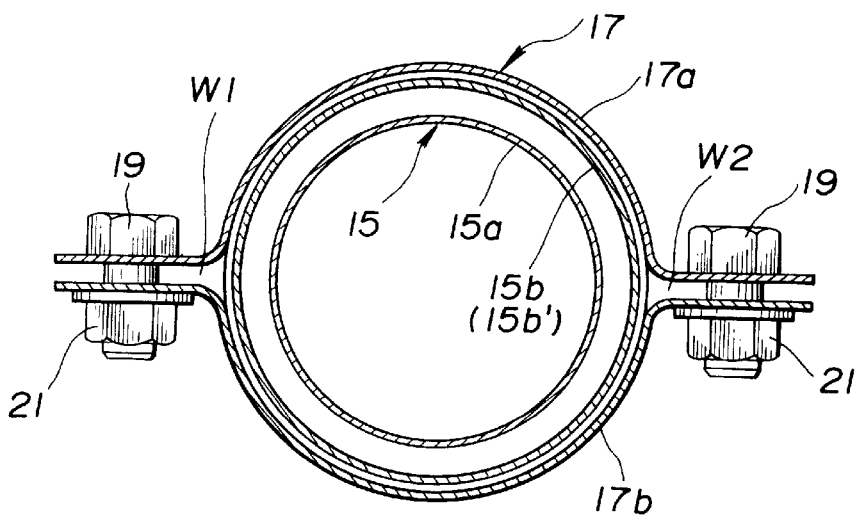
FIG. 4 is a sectional view taken along the line IV—IV of FIG. 3.

Second, since the mated enlarged end portions 31a and 33a of the two pipes 31 and 33 are entirely covered and intimately pressed by the shaped fastening band 37, sealing between the two pipes 31 and 33 is assured, unlike in case of the above-mentioned conventional coupling structure of FIGS. 3 and 4. In the conventional coupling structure, clearances "W1" and "W2" causing insufficiency in sealing are inevitably produced. While, in the invention, there is no possibility of producing such undesired clearances.

Third, during the pressing or rolling process of the fastening ring 37, the annular ridge 35a of the collar member 35 can serve as a so-called mandrel. Thus, shaping of the fastening ring 37 can be assuredly made. In fact, provision of such annular ridge 35a increases the rigidity of the collar member 35.

Fourth, due to engagement between the bosses 35b and 33b of the pipes 31 and 33 and the notches 35b and 35c of the collar member 35, rotation of the collar member 35 relative to the pipes 31 and 33 and vise versa are suppressed, which promotes the sealing between the two pipes 31 and 33.

Fifth, since the coupling structure of the invention is slender in shape, it hardly affects the layout of the piping of the exhaust system arranged under a vehicle body.

Although the above description is direct to an example wherein the invention is used for coupling metal pipes 31 and 33, the invention is usable for coupling plastic pipes. Of course, also in this case, the collar member 35 and the fastening ring 37 are constructed of metal, such as stainless steel. Furthermore, the invention is also usable for coupling two pipes having different diameters. In this case, one of the enlarged end portions of the two pipes is so sized as to match with the other enlarged end portion, and the collar member should have a corresponding shape. Furthermore, the invention is usable for coupling two pipes having an oval cross section or rectangular cross section. If desired, each pipe 31 or 33 may have two or three bosses 31b or 33b projected inward. In this case, each end of the collar member 35 has a corresponding number of notches 35b or 35c.

What is claimed is:

1. A coupling structure, comprising:

first and second metal pipes which are aligned and each respectively have a diametrically enlarged end portion with respective leading ends abutting each other, the abutted enlarged end portions being formed with rounded outer surfaces;

a metal collar member concentrically disposed within the abutted enlarged end portions of the pipes, said collar member being formed, around an axially middle portion thereof, with an annular ridge which is substantially entirely in contact with inner surfaces of said abutted enlarged end portions;

a metal fastening ring concentrically disposed about the abutted enlarged end portions of the pipes, said fastening ring being subject to one of pressing and rolling processes to be shaped to have a concave inner surface which substantially entirely contacts said rounded outer surfaces of said abutted enlarged end portions of the pipes; and a rotation stopper for suppressing relative rotation between said collar member and each of said first and second metal pipes, said rotation stopper including an inwardly projected boss on each of said first and second metal pipes, and a notch formed in each axial end of said collar member, wherein each of said notches accommodated therein one of said bosses.

2. A coupling structure as claimed in claim 1, in which said fastening has been provided by putting a flat metal ring member on the abutted enlarged end portions of the pipes and subjecting the same to a pressing or rolling process.

3. A coupling structure as claimed in claim 1, in which said annular ridge formed on said collar member has a generally semicircular cross section.

4. A coupling structure as claimed in claim 1, in which said first and second pipes, said collar member and said fastening ring comprise stainless steel.

5. A coupling structure as claimed in claim 4, in which the thickness of said first and second pipes is approximately 0.8 mm, the thickness of said collar member is approximately 0.8 mm and the thickness of said fastening ring is approximately 0.3 mm.

6. A coupling structure as claimed in claim 4, in which the thickness of said first and second pipes is approximately 0.8 mm, the thickness of said collar member is approximately 1.0 mm and the thickness of said fastening ring is approximately 0.3 mm.

\* \* \* \* \*